Jan. 7, 1958
R. K. POTTLE
2,819,001
CONTAINER WITH PLASTIC NOZZLE AND METHOD OF ATTACHING NOZZLE
Filed July 23, 1954
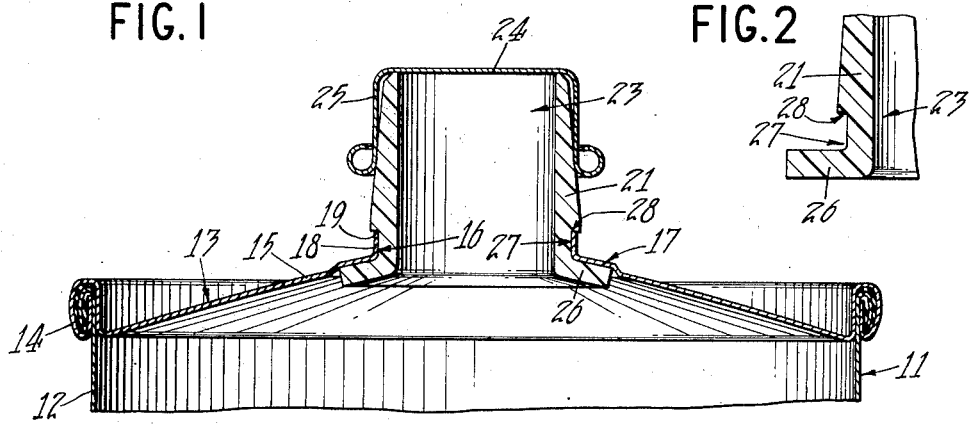
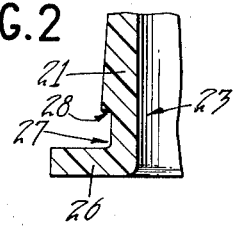
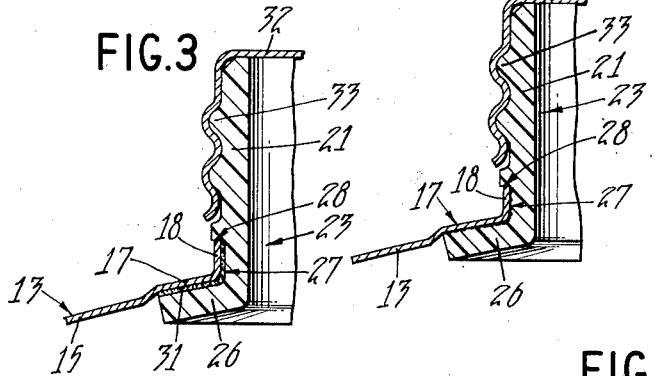
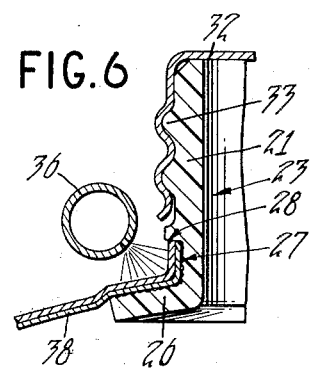
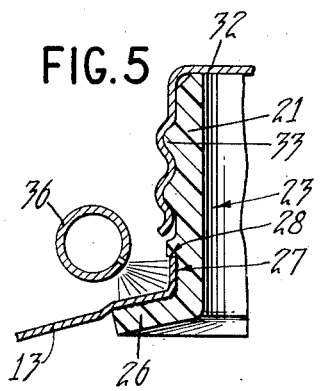
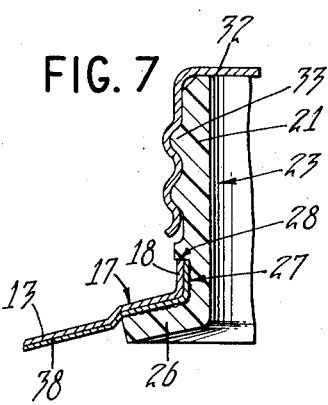
INVENTOR.
RALPH K. POTTLE
BY Charles H. Erne
Leland P. McCann
George W. Reiber
ATTORNEYS

2,819,001

CONTAINER WITH PLASTIC NOZZLE AND METHOD OF ATTACHING NOZZLE

Ralph K. Pottle, Georgetown, Conn., assignor to American Can Company, New York, N. Y., a corporation of New Jersey Application July 23, 1954, Serial No. 445,282

16 Claims. (Cl. 222—566)

The present invention relates to containers having separately attached plastic nozzles and has particular reference to a nozzle construction which is readily pushed into place in a prepared opening in the container and to a method of securing the nozzle against displacement.

In the manufacture of sheet metal cans or containers for marketing corrosive liquid products such as detergents and the like, it has been found that separately attached dispensing nozzles made of plastic materials are well adapted to withstand the corrosive action of the products. Because of the elastic or resilient nature of plastic materials, dispensing nozzles made from such materials can be readily formed in such a manner that they can be forced into a prepared opening in a container and thereby provide for rapid and economical assembly of the nozzle to the container.

Results of experimentation, however, show that when a plastic nozzle of oversize dimensions is provided to produce a tight friction fit within a container opening, the material over a period of storage time at room temperature gradually shrinks away from the container opening with the result that the nozzle becomes loose in the opening. This shrinkage varies in accordance with the "cold flow" characteristics of the particular plastic material from which the nozzles are made. When polyethylene is used this shrinkage is not excessive enough to prevent utility when a slip cover or cap is used to close the nozzle but is excessive for a screw cap. When vinyl plastic material is used the shrinkage is not excessive but is enough so that when a screw cap is used, the nozzle turns in the opening with the turning of the cap so that the cap cannot be removed and thus the usefulness of the nozzle is destroyed.

An object of the invention is the provision of a container having a prepared opening and a plastic "push-in" type dispensing nozzle inserted therein and a method for securing the nozzle in the opening against displacement.

Another object is the provision of such a container and method of securing the nozzle in place wherein the nozzle is made with a resilient flange for clamping cooperation with a portion of the container so that the nozzle may be readily pushed into a prepared opening in the container and when seated is frictionally locked in place.

Another object is the provision of such a container and method of securing the nozzle in place wherein the nozzle is bonded to the container through the use of adhesives, solvents, or heat treatment to increase the torque resistance of the nozzle relative to the container so that screw caps or other rotatable closures may be used with the nozzles.

Numerous other objects and advantages of the invention will be apparent as it is better understood from the following description, which, taken in connection with the accompanying drawings, discloses a preferred embodiment thereof.

Referring to the drawings:

Figure 1 is a sectional view through the upper portion of a sheet metal container embodying the instant invention and including a plastic nozzle attached to the container in accordance with the method steps of the instant invention;

Fig. 2 is a fragmentary sectional view of the flange portion of the nozzle shown in Fig. 1, before attachment to the container.

Figs. 3, 4, and 5 are fragmentary sectional views of screw nozzles on a container of the character shown in Fig. 1, the views showing different methods of securing a nozzle to uncoated sheet metal containers; and Figs. 6 and 7 are views similar to Figs. 3, 4, and 5 and showing different methods of securing a nozzle to coated sheet metal containers.

As a preferred or exemplary embodiment of the instant invention the drawings illustrate a sheet metal container 11 (Fig. 1) for corrosive liquid products, such as detergents and the like. The container 11 preferably comprises a cylindrical tubular body 12 having a bottom end closure (not shown) and a top end closure 13 secured to the body in suitable end seams 14.

The top end closure member 13 preferably is formed with a conical top wall section 15 which at its apex is formed with a mouth 16 surrounded by an embossed annular tapered or conical seat 17 and an upstanding collar 18 terminating in a top raw edge 19.

A plastic nozzle 21 is disposed in the container mouth 16 for dispensing the liquid contents of the container. This nozzle 21 preferably is made of hard or soft polyethylene which is elastic and resilient enough to permit assembling of the nozzle to the container by forcing it into the mouth 16 from the inside of the end closure member 13 prior to assembly of the member 13 to the container body 12.

The nozzle 21 is a cylindrical member having a dispensing throat 23 open at both ends. The outer surface of the upper end of the nozzle is slightly tapered to receive a slip cover or cap 24 having a depending skirt portion 25 adapted to surround the upper end of the nozzle in frictional engagement with the tapered outer surface of the nozzle. The lower end of the nozzle 21 is formed with an outwardly projecting peripheral flange 26 which as shown in Fig. 2 is normal or substantially normal to the axis of the nozzle throat 23. Immediately above this flange 26 the outer surface of the nozzle is formed with a reduced diameter annular groove or channel 27 (Fig. 2) defined along its upper edge by a sharp shoulder 28. The outside diameter of the bottom of the channel 27 is slightly greater than or substantially equal to the inside diameter of the collar 18 on the closure member 13. The width of the channel 27 is substantially the same as the height of the collar 18 surrounding the mouth 16 of the container top end closure 13.

The nozzle 21 is assembled with the container end closure member 13, by pushing the tapered upper end of the nozzle through the mouth 16 of the end closure member until the closure member collar 18 snaps into the nozzle channel 27. In this position the collar 18 fits snugly into the channel 27 with the top raw edge 19 of the collar pressed tightly against the shoulder 28 in the nozzle. In this fully inserted position of the nozzle, the tapered or conical seat 17 of the closure member 13 bends or deflects the resilient flange 26 of the nozzle downwardly as shown in Fig. 1 and thus clamps or holds the flange tightly against the inner face of the seat 17. The flange 26 thus serves as a yieldable pressure element which holds the raw edge 19 of the collar 18 in contact with the shoulder 28 in the nozzle 21. The nozzle 21 is thus securely locked in the closure member 13 for use as a dispensing element for the container 11. This type of friction seal between the nozzle and the closure member preferably is for use with nozzles closed by slip covers such as the cap 24.

For a more secure attachment of the nozzle 21 to the closure member 13 to increase the torque resistance between these parts, they are bonded together so that the nozzle may be closed with a screw cap. In the instant case as shown in Fig. 3 a suitable adhesive 31 such as any of the well known phenolic formaldehyde resin cements or polyvinyl acetate adhesives is used as a bonding agent. The adhesive 31 is applied preferably to the nozzle flange 26 and to the nozzle faces defining the channel 27 of the nozzle as shown in Fig. 3. Hence when the nozzle 21 is inserted into the mouth 16 of the end closure member 13 for assembly with a closure member, the adhesive 31 bonds the flange 26 and faces of the channel 27 of the nozzle to the contacting surfaces of the seat 17 and collar 18 of the top end closure member 13 and thus increases the resistance of the nozzle 21 to turning or rotation in the mouth 16 of the end closure.

When a screw cap 32 (Fig. 3) is desired to be used instead of the slip cap 24 to close the nozzle 21, the outer surface of the upper portion of the nozzle is provided with screw threads 33 instead of the tapered outer surface illustrated in Figs. 1 and 2. These screw threads 33 in no way prevent the nozzle from being inserted into and through the mouth 16 of the end closure member 13 to assemble the nozzle with the member as explained above because of the elastic or resilient nature of the plastic material from which the nozzle is made.

In the method of securing the plastic nozzle 21 against rotation in the mouth 16 of the closure member 13, the collar 18 is provided on the closure member and the flange 26 and channel 27 are provided on the nozzle 21. The nozzle is inserted into the closure member mouth 16 to engage the collar 18 in the channel 27 and these parts as well as the flange 26 and seat 17 are bonded together to increase the torque resistance between them. Bonding together of the parts may be effected by adhesive or by tackifying the nozzle and/or coatings on the closure member before or after assembly of the parts.

Where the nozzle 21 is made of vinyl plastic material the closure member contacting surfaces of the nozzle may be tackified by various methods to tightly bond the nozzle to the closure member and thereby greatly increase the torque resistance when screw caps are used on the nozzles. It has also been found that by applying a suitable adhesive such as any of the well known phenolic formaldehyde resin cements or polyvinyl acetate adhesives to the flange 26 and faces of the channel 27 of a vinyl plastic nozzle in the same manner as with a polyethylene plastic nozzle as shown in Fig. 3, good results have been achieved in increasing the torque resistance of the nozzle. The adhesive is usually applied to the nozzle before insertion of the nozzle into the container mouth.

One of the methods used in tackifying the contacting surfaces of the nozzle as above mentioned is to apply a suitable solvent such as acetone or methyl ethyl ketone to the flange 26 and faces of the channel 27 of the nozzle 21 as shown in Fig. 4. The solvent softens and reduces these surfaces to a tacky condition and upon assembly of the nozzle to the end closure member 13, bonds the tacky surfaces to the seat 17 and collar 18 of the closure member 13 together so tenaciously as to greatly increase the torque resistance of the nozzle relative to the closure member.

The same result may be accomplished by heating the closure member contacting surfaces of the nozzle. In this method of bonding the nozzle to the closure member, the nozzle preferably is assembled with the closure member 13 as explined above and heat applied to the outer surfaces of the seat 17 and collar 18 of the closure member 13 as shown in Fig. 5. This application of heat may be effected by any suitable heating element 36 such as for example a direct flame from a gas burner, or an electric or electronic heating device. The heat applied to the seat 17 and collar 18 of the closure member 13 partially melts the contacting surfaces of the nozzle flange 26 and faces of the nozzle channel 27 and reduces them to a tacky condition which effects tight bonding or fusing of these surfaces to the closure member.

In another method of bonding the nozzle 21 to the closure member 13, the interior surface of the closure member or at least the interior surface of the seat 17 is coated with a film 38 (Fig. 6) of thermoplastic material such as the well known polyvinyl acetate or in some cases a thermosetting material such as the well known phenolic-formaldehyde resin and permitted to dry or harden. The nozzle 21 is then assembled with the closure member 13 as explained above, and heat from a suitable source of such heat, for example the heating element 36, is applied to the exterior surfaces of the seat 17 and collar 18 of the closure member as shown in Fig. 6. This applied that softens and reduces the film 38 of thermoplastic or thermosetting material to a tacky condition and also reduces the contacting faces of the nozzle flange 26 and channel 27, to a tacky condition and results in a fusing of these surfaces to bond the nozzle to the top end closure member 13 and thus increases the torque resistance.

In still another method of bonding the nozzle 21 to the closure member 13, where the film 38 of thermoplastic or thermosetting material is used on the interior surfaces or at least on the seat 17 of the closure member 13, a suitable solvent such as acetone or methyl ethyl ketone is applied to the closure member contacting surfaces of the nozzle flange 26 and channel 27 and/or to the end closure member seat 17 and collar 18, and the nozzle 21 is assembled with the closure member as explained above (see Fig. 7). The solvent thus being introduced between the contacting surfaces of the film 38 and the nozzle 21, reduces these contacting surfaces to a tacky condition and bonds them together to increase the torque resistance between the nozzle and closure member.

By any and all of these methods, the nozzle 21 is bonded so tightly to the closure member 13, that a screw cap may be readily used to close the nozzle with the assurance that it always can be removed without turning of the nozzle relative to the container end closure member 13. Where a screw cap is not required, as in the use of a friction fit slip cap, the friction lock with or without an interposed adhesive, adequately retains the nozzle in place for certain practical purposes.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. A container for corrosive liquids, comprising a sheet metal body having a sheet metal end member seamed thereto, said end member having an inclined surface terminating in an upright collar surrounding a dispensing mouth and terminating in an upstanding peripheral raw edge, a tubular deformable nozzle of resilient plastic material disposed within said mouth, said nozzle having a peripheral channel for snugly receiving said end member collar therein, said channel terminating at its upper end in an annular shoulder engaging the raw edge of the collar, said deformable plastic nozzle terimnating at its inner end in a laterally extending axially deflected peripheral flange disposed in clamping engagement with the inner inclined surface of said end member to hold the upstanding raw edge of its said collar in clamped engagement with said channel shoulder, and a removable cap having a depending skirt thereon for closing the outer end of said nozzle, whereby the aforesaid clamped engagement of said end member with the nozzle provides sufficient torque resistance therebetween to hold the same against relative rotation during manipulation of said cap.

2. The container of claim 1 wherein interengageable screw threads are provided on said plastic nozzle and said depending cap skirt for removable clamping the cap in sealing engagement with the nozzle.

3. A container as defined in claim 2, wherein an adhesive is interposed between said end member collar and said plastic nozzle channel to increase the torque resistance between said nozzle and end member.

4. A container as defined in claim 3, wherein an adhesive is interposed between said inclined end member surface and said nozzle flange to further increase the torque resistance between said nozzle and end member.

5. A container of the character disclosed in claim 1 in which said nozzle is fused to the contacting surfaces of said closure member to increase the torque resistance between said nozzle and said closure member.

6. A container of the character disclosed in claim 1 in which the inner surface of said closure member adjacent said mouth carries a film of thermoplastic material and in which said nozzle is fused to said thermoplastic material to increase the torque resistance between said nozzle and said closure member.

7. A container of the character disclosed in claim 1 wherein the inner surface of said closure member adjacent said mouth carries a film of thermosetting material fused to said nozzle to increase the torque resistance between said nozzle and said closure member.

8. A method of securing a plastic nozzle against rotation in the mouth of a sheet metal container, said mouth being defined by an upstanding sheet metal collar and said nozzle having an exterior annular channel of a width substantially equal to the height of said collar, comprising inserting the outer end of said nozzle into said mouth to snap said collar into said channel and heat bonding said collar and nozzle together in the region of said channel to increase the torque resistance between said nozzle and collar.

9. A method of securing a plastic nozzle against rotation in the mouth of a sheet metal container, said mouth being defined by an upstanding sheet metal collar and said nozzle having an exterior annular channel of a width substantially equal to the height of said collar, comprising inserting the outer end of said nozzle into said mouth to snap said collar into said channel, and tackifying the plastic material of said nozzle in the region of said channel to securely bond said collar and nozzle together with a maximum of torque resistance therebetween.

10. A method of securing a plastic nozzle against rotation in the mouth of a sheet metal container, said mouth being defined by an upstanding sheet metal collar and said nozzle having an exterior annular channel of a width substantially equal to the height of said collar, comprising inserting the outer end of said nozzle into said mouth to snap said collar into said channel and fusing the plastic material of said nozzle in the region of said channel to bond said collar and nozzle together with a maximum of torque resistance therebetween.

11. A method of securing a plastic nozzle against rotation in the mouth of a sheet metal container, comprising forming an upright sheet metal collar having a film of thermoplastic material on its inner surface around said container mouth, forming an annular channel in the outer surface of said nozzle of a width substantially equal to the height of said collar, inserting the outer end of said nozzle into said mouth to snap said collar into said channel, and fusing said film and said nozzle in the region of said channel to permanently bond said collar and nozzle together with a maximum of torque resistance therebetween.

12. A method of securing a plastic nozzle against rotation in the mouth of a sheet metal container, comprising forming an upright collar having a film of thermosetting material on its inner surface around said mouth to define the latter, forming an annular channel in the outer surface of said nozzle of a width substantially equal to the height of said collar, inserting the outer end of said nozzle into said mouth to snap said collar into said channel, and fusing said film to the plastic material of said nozzle in the region of said channel to permanently bond said collar and said nozzle together with a maximum of torque resistance therebetween.

13. A method of securing a plastic nozzle against rotation in the mouth of a sheet metal container, comprising forming an upright sheet metal collar around said mouth to define the latter, forming an annular channel in the outer surface of said nozzle of a width substantially equal to the height of said collar, projecting the outer end of said nozzle through said mouth to snap said collar into said channel, and heating said collar and nozzle in the region of said channel to securely bond said collar to the plastic material of said nozzle with a maximum of torque resistance therebetween.

14. A method of securing a plastic nozzle against rotation in the mouth of a sheet metal container, comprising forming an upright collar having a film of heat tackifying material on its inner surface around said mouth to define the latter, forming an annular channel in the outer surface of said nozzle of a width substantially equal to the height of said collar, projecting the outer end of said nozzle outwardly through said mouth to snap said collar into said channel, and heating said film and said nozzle in the region of said channel to permanently bond said collar to the plastic material of said nozzle with a maximum of torque resistance therebetween.

15. A method of securing a plastic nozzle against rotation in the mouth of a sheet metal container, comprising forming an upright collar around said mouth to define the latter, forming an annular channel in the outer surface of said nozzle of a width substantially equal to the height of said collar, projecting the outer end of said nozzle outwardly through said mouth to snap said collar into said channel, and interposing a solvent between said collar and nozzle channel to tackify the plastic material of said nozzle to permanently bond said collar and nozzle together with a maximum of torque resistance therebetween.

16. A method of securing a plastic nozzle against rotation in the mouth of a sheet metal container, comprising forming an upright collar having a film of thermoplastic material on its inner surface around said mouth to define the latter, forming an annular channel in the outer surface of said nozzle of a width substantially equal to the height of said collar, projecting the outer end of said nozzle outwardly through said mouth to snap said collar into said channel, and interposing a solvent between said film and said nozzle in the region of said channel to tackify and securely bond together said film and nozzle with a maximum of torque resistance therebetween.

References Cited in the file of this patent

UNITED STATES PATENTS

| | | |
|---|---|---|
| 2,002,718 | Roselle | May 28, 1935 |
| 2,278,141 | Warth | Mar. 31, 1942 |
| 2,690,861 | Tupper | Oct. 5, 1954 |

FOREIGN PATENTS

| | | |
|---|---|---|
| 551,151 | Great Britain | Feb. 9, 1954 |
| 705,054 | France | Mar. 2, 1931 |